(12) United States Patent
Izumo et al.

(10) Patent No.: US 9,354,109 B2
(45) Date of Patent: May 31, 2016

(54) WEIGHING APPARATUS THAT CORRELATES ENVIRONMENTAL FLUCTUATIONS WITH WEIGHT RESULTS

(75) Inventors: Naoto Izumo, Kitamoto (JP); Yoshikazu Nagane, Kitamoto (JP)

(73) Assignee: A&D COMPANY, LIMITED, Tokyo (JP)

(*) Notice: Subject to any disclaimer, the term of this patent is extended or adjusted under 35 U.S.C. 154(b) by 323 days.

(21) Appl. No.: 13/981,869

(22) PCT Filed: Aug. 24, 2011

(86) PCT No.: PCT/JP2011/069013
§ 371 (c)(1),
(2), (4) Date: Jul. 25, 2013

(87) PCT Pub. No.: WO2012/101854
PCT Pub. Date: Aug. 2, 2012

(65) Prior Publication Data
US 2013/0306382 A1    Nov. 21, 2013

(30) Foreign Application Priority Data

Jan. 28, 2011  (JP) ................................. 2011-016175

(51) Int. Cl.
*G01G 23/26*    (2006.01)
*G01G 23/36*    (2006.01)
(Continued)

(52) U.S. Cl.
CPC ............... *G01G 23/36* (2013.01); *G01G 23/01* (2013.01); *G01G 23/012* (2013.01); *G01G 23/48* (2013.01); *G01G 23/166* (2013.01)

(58) Field of Classification Search
CPC ..... G01G 23/01; G01G 23/012; G01G 23/66; G01G 23/36; G01G 23/38; G01G 23/48
See application file for complete search history.

(56) References Cited

U.S. PATENT DOCUMENTS 4,846,293 A    7/1989    Li
4,858,161 A *  8/1989    Baumann .................... 702/101
(Continued)

FOREIGN PATENT DOCUMENTS

JP    62-280624 A    12/1987
JP    4-501169 A     2/1992
(Continued)

OTHER PUBLICATIONS

Hyperphysics entry for "mass spectrometer" downloaded Aug. 6, 2015.*

*Primary Examiner* — Peter Macchiarolo
*Assistant Examiner* — Natalie Huls
(74) *Attorney, Agent, or Firm* — Roberts Mlotkowski Safran & Cole, PC

(57) ABSTRACT

To provide a weighing apparatus by which it is possible for a user himself/herself to determine poor performance of the apparatus is a factor attributable to an installation environment, and the weighing accuracy is improved. Respective temporal fluctuations in weighed data detected from a load measuring mechanism 2 and environmental measurement data detected in an environmental measurement means 10 are recorded in a correlative manner in an arithmetic processing unit 32, and the temporal fluctuations are visually recognizable via a display unit 31. Thereby, the correlation between the environmental variations and the weighed data is visually disclosed, which makes it possible for a user to easily recognize that poor performance of the apparatus is attributable to the environmental variations, that increases the reliability of the weighing apparatus. Further, the fundamental performance (accuracy) presented by the apparatus is also assured by allowing the user himself/herself to improve the surrounding environment.

7 Claims, 6 Drawing Sheets

(51) Int. Cl.
   *G01G 23/01* (2006.01)
   *G01G 23/48* (2006.01)
   *G01G 23/16* (2006.01)

(56) References Cited

U.S. PATENT DOCUMENTS

| | | | |
|---|---|---|---|
| 5,056,050 A * | 10/1991 | Fuchs et al. | 702/101 |
| 5,191,543 A * | 3/1993 | Berthel et al. | 702/101 |
| 2005/0072605 A1* | 4/2005 | Kunzi et al. | 177/126 |
| 2005/0161543 A1* | 7/2005 | Stiner | G01G 19/60 242/223 |
| 2007/0007050 A1* | 1/2007 | Reber et al. | 177/212 |
| 2007/0010960 A1* | 1/2007 | Tellenbach et al. | 702/105 |
| 2007/0119226 A1* | 5/2007 | Tellenbach et al. | 73/1.15 |
| 2009/0057038 A1* | 3/2009 | Kusumoto | 177/211 |
| 2009/0100899 A1* | 4/2009 | Hamamoto et al. | 73/1.13 |
| 2010/0004876 A1* | 1/2010 | Loher et al. | 702/41 |
| 2010/0078228 A1* | 4/2010 | Trautweiler et al. | 177/25.13 |
| 2012/0123721 A1* | 5/2012 | Yeon et al. | 702/101 |
| 2012/0173168 A1* | 7/2012 | Koppel et al. | 702/44 |
| 2014/0150519 A1* | 6/2014 | Iizuka | 73/1.13 |
| 2014/0297229 A1* | 10/2014 | Izumo et al. | 702/189 |
| 2014/0312980 A1* | 10/2014 | Villard et al. | 331/2 |

FOREIGN PATENT DOCUMENTS

| | | |
|---|---|---|
| JP | 6-84319 U | 12/1994 |
| JP | 8-114489 A | 5/1996 |
| JP | 2001-99699 A | 4/2001 |
| JP | 2005-530987 A | 10/2005 |
| JP | 2005-331367 A | 12/2005 |
| JP | 2007-139768 A | 6/2007 |

* cited by examiner

WEIGHING APPARATUS THAT CORRELATES ENVIRONMENTAL FLUCTUATIONS WITH WEIGHT RESULTS

TECHNICAL FIELD

The present invention relates to a weighing apparatus including a mass spectrometer such as an electronic balance, and particularly, to a weighing apparatus including a mass spectrometer with high weighing accuracy such as an analytical balance or a micro electronic balance, as one of the components.

BACKGROUND OF THE INVENTION (1) Field of the Invention

For example, in a weighing apparatus which includes a mass spectrometer such as an electromagnetic equilibrium system electronic balance, as one of the components, and in which another device such as a PC or a printer for outputting measurement results is connected to the electronic balance, it has been known that variations in environmental conditions such as temperature, humidity, atmospheric pressure, and vibration in an installation site of the electronic balance have effects on a measurement sensitivity, a zero-point (an unloaded weighed value), and a span value (a difference between a weighed value at the time of weighing a load with an already-known mass and the zero-point), that results in a factor preventing high-accuracy measurement. In particular, in an analytical electronic balance whose accuracy of reading a weighed value (minimum display) is 0.1 mg or less, and moreover, in a microelectronic balance whose accuracy of reading a weighed value is 0.1 .mu.g or less, the effect on a measurement result (weighed value) which a weighing error caused by variations in environmental conditions is extremely large.

(2) Description of Related Art

Japanese Published Unexamined Patent Application No. S62-280624 discloses a weighing apparatus including a function that, in order to reduce errors by variations in environmental conditions, so as to approximate a weighed value to a true value, environmental factors (temperature, humidity, atmospheric pressure, vibration, and the like) having effects on weighing are recorded (undergoes monitoring), and environmental measurement data obtained from the record are used as correction values at the time of calibration (see page 1 and the claims). Japanese Published Unexamined Patent Application No. 2007-139768 discloses a weighing apparatus that evaluates whether or not the recorded environmental measurement data are within the allowable values for bringing out the fundamental performance of the weighing apparatus, and when the data are greater than or equal to the allowable values, that effect is displayed so as to urge a user to correct the values (see paragraphs [0046], and [0049] to [0053], and FIGS. 2 to 5).

SUMMARY OF THE INVENTION

Problem to be Solved by the Invention

However, there have been many accounts from users that the fundamental performance assured by the weighing apparatus has not been brought about even after calibration of correction in the aforementioned conventional weighing apparatus.

As a cause for this, in some cases, this may result from variations in the surrounding environment of the apparatus such as a rapid temperature change by a motion of an air conditioner, changes in atmospheric pressure and humidity by a passing low pressure system, or distant earthquake. No matter how many times a user carries out calibration under widely varying environmental conditions, the fundamental performance is not brought about unless the variations in the surrounding environment become settled. In the conventional weighing apparatus, although these environmental variations in the surrounding environment (installation environment) are recorded (undergo monitoring), the analysis results obtained by the monitoring are merely disclosed (displayed), and the appearance of the monitoring (temporal fluctuations in data) have not been disclosed to users. Even more, it has been impossible for users to know how environmental variations have had effects on a measurement result (weighed value), and what kinds of correlative relationships exist between the environmental variations and the weighed value.

Therefore, a problem has occurred that, in the case where the fundamental performance does not result even after calibration (calibrations are carried out many times), it is impossible for a user to understand whether the cause for that is poor performance resulting from the installation environment, or poor performance in the weighing apparatus main body, and this increases anxiety over whether to continue the weighing or trusting the weighed value, and substantially feeds uncertainty into the mass spectrometer itself.

The present invention is, first, to provide a user-friendly weighing apparatus which includes means which enables a user to recognize how much an installation environment of the weighing apparatus has an effect on weighing, thereby making it is possible for the user himself/herself to determine poor performance of the apparatus is a factor attributable to the installation environment, to reduce anxiety in use, allowing the users to use the apparatus with confidence, including understanding error factors by environment, and second, to provide a weighing apparatus which is, by including the above-described means thereof, capable of improving the weighing accuracy from a new perspective (angle) of improving the installation environment.

Means for Solving the Problem(s)

In order to achieve the aforementioned object, a weighing apparatus according to a first aspect of the invention includes a load measuring mechanism that detects weighed data, environmental measurement means for detecting physical amounts in an environment in which the load measuring mechanism is installed, storage means for storing the weighed data detected by the load measuring mechanism, and environmental measurement data detected by the environmental measurement means, and an arithmetic processing unit which performs arithmetic processing by use of the weighed data and the environmental measurement data stored in the storage means, and in the weighing apparatus, the arithmetic processing unit is configured to correlate and record respective temporal fluctuations in the weighed data and the environmental measurement data, so as to make the temporal fluctuations visually recognizable via a display unit.

In accordance with a second aspect of the invention, in the weighing apparatus according to the first aspect, the arithmetic processing unit is configured to correlate at least one of a zero-point that is unloaded weighed data and a weight that is loaded weighed data with the recorded data, so as to make those visually recognizable via the display unit.

(Operation of the invention) In the first and second aspects, it is understood that the weighed data (the zero-point that is unloaded weighed data and the weight that is loaded weighed data) used for calculation of a weighed result (weighed value) of a load mass as an object to be weighed varies so as to be correlated with environmental variations (temperature, humidity, atmospheric pressure, vibration, and the like) in which the load measuring mechanism is placed. For example, a temperature change causes sensitivity drifting, and a change in mass moment due to a humidity change and a buoyancy modification due to an atmospheric pressure change causes zero-point drifting.

Then, the apparatus is configured such that the environmental measurement data of the apparatus surroundings and the weighed data are simultaneously recorded (undergo monitoring), to correlate both, so as to be capable of visually recognizing the respective temporal fluctuations (the appearance of simultaneous monitoring) of the environmental measurement data and the weighed data via the display unit, thereby visually disclosing the correlation between the environmental variations and the weighed data which has not conventionally become apparent, which makes it possible for a user to easily recognize that poor performance of the apparatus is attributable to environmental variations.

Moreover, provided that amounts of variations of the respective values are determined from the simultaneous recording of the environmental measurement data and the weighed data, to perform correlation analysis, and the like, so as to determine a coefficient for judging a correlation between the environmental variations and the weighed data, and means for judging and evaluating the influence rates of environmental parameters on variations in weighed data is provided, and the evaluation results are presented to a user, it is possible for the user to estimate, for example, for temperature management, to what extent improvements are required for weighed data to be within a target management range, thus it is possible for the user himself/herself to conduct the environmental improvement. Or, provided that a minimum display of a weighed value which is determinable under the current environment is estimated to be presented from the influence rate judging means, it is possible to inform the user of the maximal performance obtained under the current environment, thus it is possible for the user himself/herself to judge on the scene whether or not the weighing is continued.

In accordance with a third aspect of the invention, in the weighing apparatus according to the first aspect or the second aspect, the arithmetic processing unit is configured to compute a span value which is a difference between weighed data at the time of weighing a load with an already-known mass and unloaded weighed data, and correlate the difference with the recorded data, so as to make those visually recognizable via the display unit.

(Operation of the invention) Because the weighed data (zero-point, weight) vary according to environmental variations, these are simultaneously recorded so as to be correlated with each other, it is possible to recognize the correlation between the environmental variations and the weighed data. In addition, temporal fluctuations in a span value which is a difference between weighed data at the time of weighing a load with an already-known mass and unloaded weighed data (zero-point) are recorded, thereby it is possible to understand that the difference is constantly weighed and how stable the already-known mass is weighed, and therefore, a variation in span value is also displayed in a correlative manner, thereby it is possible to understand how the environmental variations are correlated with the reliability of the weighing apparatus.

In accordance with a fourth aspect of the invention, in the weighing apparatus according to the third aspect, the arithmetic processing unit is configured to compute a standard deviation of the span value which is determined by repeatedly weighing the load with the already-known mass several times, and correlate the standard deviation with the recorded data, so as to make those visually recognizable via the display unit.

(Operation of the invention) Because the temporal fluctuations in standard deviation of the span value which is determined by repeatedly weighing the load with the already-known mass several times are recorded, it is possible to reliably know how the span value is reproduced, and providing the capability of showing the same weighed value even by calculating the same mass many times, thus the variations in standard deviation of the span value are also displayed in a correlative manner, thereby it is possible to understand how the environmental variations are correlated with the reliability of the weighing apparatus.

In accordance with a fifth aspect of the invention, in the weighing apparatus according to the second aspect, the arithmetic processing unit is configured to determine a standard deviation by repeatedly weighing the zero-point or the weight, and correlate the standard deviation with the recorded data, so as to make those visually recognizable via the display unit.

(Operation of the invention) The temporal variations in standard deviation of the zero-point or the weight that is measurement data are recorded, thereby it is possible to reliably know how the weighed data is reproduced, thus the fluctuations in standard deviation of the zero-point or the weight are also displayed in a correlative manner, thereby it is possible to understand how the environmental variations are correlated with the reliability of the weighing apparatus.

In accordance with a sixth aspect of the invention, in the weighing apparatus according to any one of the first to fifth aspects, the temporal fluctuations are configured to be displayed as temporal fluctuation graphs expressed with respect to a temporal axis on the display unit.

(Operation of the invention) Because the temporal fluctuations in respective values are displayed as a time-series graph on the same temporal axis, the correlation (correspondence relation) between the environmental variations and the weighed data, the span value, and the standard deviation are disclosed in an easy-to-understand way for a user.

In accordance with a seventh aspect of the invention, in the weighing apparatus according to any one of the first to sixth aspects, the environmental measurement means is provided in a mass spectrometer having the load measuring mechanism.

(Operation of the invention) The environmental measurement means is provided in the mass spectrometer which is one of the components of the weighing apparatus, to unitize the apparatus.

Advantageous Effect of the Invention

In accordance with the invention according to the first and second aspects, the temporal fluctuations in environmental measurement data and the weighed data are visually recognizable (visually displayed) in a correlative manner, thereby it possible for a user to immediately recognize the relationship between the poor performance of the apparatus and the environmental variations, which increases the reliability of the weighing apparatus for the user. Further, the fundamental performance (accuracy) presented by the apparatus is also assured by allowing the user himself/herself to improve the surrounding environment.

In accordance with the invention according to the third aspect, the temporal change in span value with which it is possible to understand how constant a difference between the weighed data at the time of weighing the already-known load and the unloaded weighed data is (how stable the weighing is), are recorded to correlate with the environmental variations, thereby it is easier to understand the correlation between the poor performance of the apparatus and the environmental variations.

In accordance with the invention according to the fourth and fifth aspects, the temporal fluctuations in standard deviation showing repeatability are recorded to correlate with the environmental variations, thereby it is easier to understand the correlation between the poor performance of the apparatus and the variations in the surrounding environment.

In accordance with the invention according to the sixth aspect, the correlation (correspondence relation) between the environmental variations and the weighed data, the span value, and the standard deviation are disclosed in an easy-to-understand way for a user.

In accordance with the invention according to the seventh aspect, the apparatus is unitized, which results in space-saving that improves usability of the weighing apparatus.

DETAILED DESCRIPTION OF THE INVENTION

A first embodiment of the present invention will be described with reference to FIGS. 1 to 6.

Figure 1:
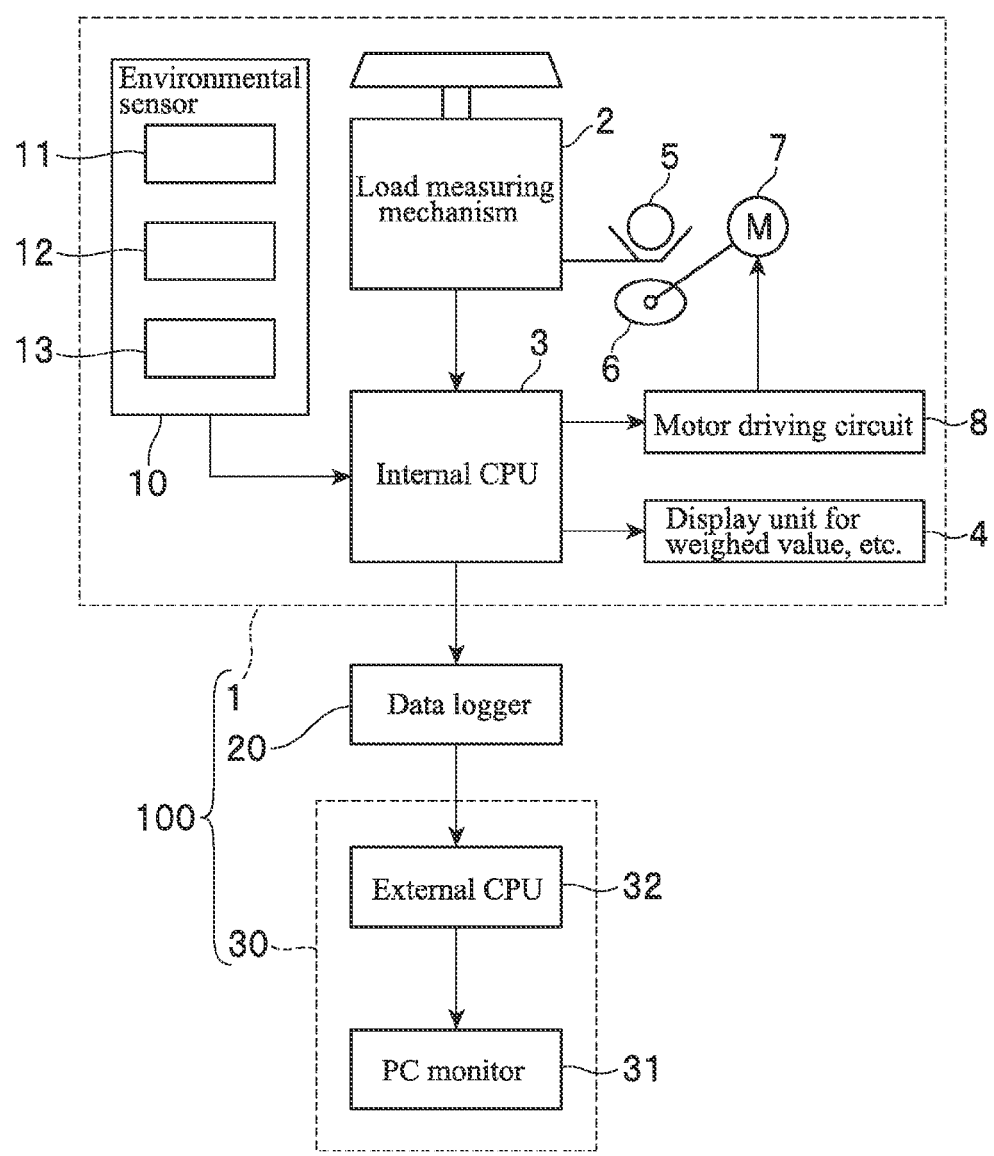
FIG. 1 is a block diagram of a weighing apparatus according to a first embodiment of the present invention.

FIG. 1 is a block diagram of a weighing apparatus according to the first embodiment. An illustrated weighing apparatus 100 is composed of an electronic balance 1 which is a mass spectrometer, a data logger 20 for storing data measured by the electronic balance 1, and an external PC 30 for analyzing the measurement data.

The electronic balance 1 is an electromagnetic equilibrium system micro electronic balance, and an accuracy of reading a weighed value (minimum display), which is a load mass as an object to be weighed, is 1 μg (0.001 mg).

In the electronic balance 1, a load measuring mechanism 2 having a load transmitting mechanism, an electromagnetic portion, and the like, a built-in balance weight inserting/deleting mechanism 6 which inserts and deletes a built-in balance weight 5 with an already-known mass into and from the load measuring mechanism 2, a motor 7 which actuates the built-in balance weight inserting/deleting mechanism 6, and a motor driving circuit 8 that controls driving of the motor 7 are provided, and the built-in balance weight 5 is configured to be automatically lifted up and down. Weighed data detected from the load measuring mechanism 2 undergoes A/D conversion from an analog signal into a digital signal by an internal CPU 3, to be sampled by data sampling means, and is thereafter stored in the data logger 20 (storage means).

Further, an environmental sensor 10 (environmental measurement means) which time-course senses changes in physical amounts in an environment in which the electronic balance 1 is installed is built in the electronic balance 1. The environmental sensor 10 is composed of a temperature sensor 11, a humidity sensor 12, and an atmospheric pressure sensor 13. The environmental measurement data (temperature, humidity, atmospheric pressure) which are time-course detected by the environmental sensor 10, are sampled in the same way as weighed data, and are thereafter stored in the data logger 20. The environmental sensor 10 may be an external device. However, the environmental sensor 10 is unitized in the electronic balance 1, which results in space-saving, so as to improve usability of the electronic balance 1. Further, a display unit 4 for weighed value, etc., on which a weighed value of mass and various types of setting contents are displayed, which is conventionally the same, is provided in the electronic balance 1.

Reference numeral 32 denotes an external CPU (arithmetic processing unit) provided in the external PC 30, which is composed of an intermediate processing unit, various types of memory mechanisms, and the like. In the external CPU 32, various types of programs which are conventionally the same, and specifically, programs for determining a weighed value of mass is determined from a difference between a weight that is loaded weighed data and a zero-point that is unloaded weighed data, and for computing a span value (a difference between weighed data at the time of weighing a load with an already-known mass and a zero-point) from weighed data obtained by automatic lifting-up/down of the built-in balance weight 5 with an already-known mass, a standard deviation of the span value which is determined by weighing span values several times, or a standard deviation of weighed data which is determined by repeatedly weighing a zero-point and a weight several times are stored.

Then, in addition to the above description, in the external CPU 32, environmental evaluation in which temporal fluctuations in the weighed data (zero-point, weight) and temporal fluctuations in the respective environmental measurement data (temperature, humidity, atmospheric pressure) which are stored in the data logger 20 are continuously or intermittently recorded, that is, undergo monitoring (the data acquired over a long period of time), and the respective temporal fluctuations are correlated with the same temporal axis is performed. Moreover, in this environmental evaluation, in addition to the aforementioned temporal fluctuations, a temporal fluctuation in the computed span value and/or standard deviation as well is correlated. Then, an instruction is issued such that the correlations between the respective temporal fluctuations are visually displayed via a monitor 31 (display unit) of the external PC 30. Specifically, an instruction is issued such that the temporal fluctuations in environmental measurement data, and the temporal fluctuations in weighed data, the span value, or the standard deviation of the span value are displayed as a temporal fluctuation graph (correlation monitoring diagram) expressed with respect to the same temporal axis.

Then, on the monitor 31 of the external PC 30, the aforementioned correlation monitoring diagrams are displayed in real-time or in a time range required from a user by instruction from the external CPU 32 (FIGS. 3, 4, 5, and 6).

Figure 2:
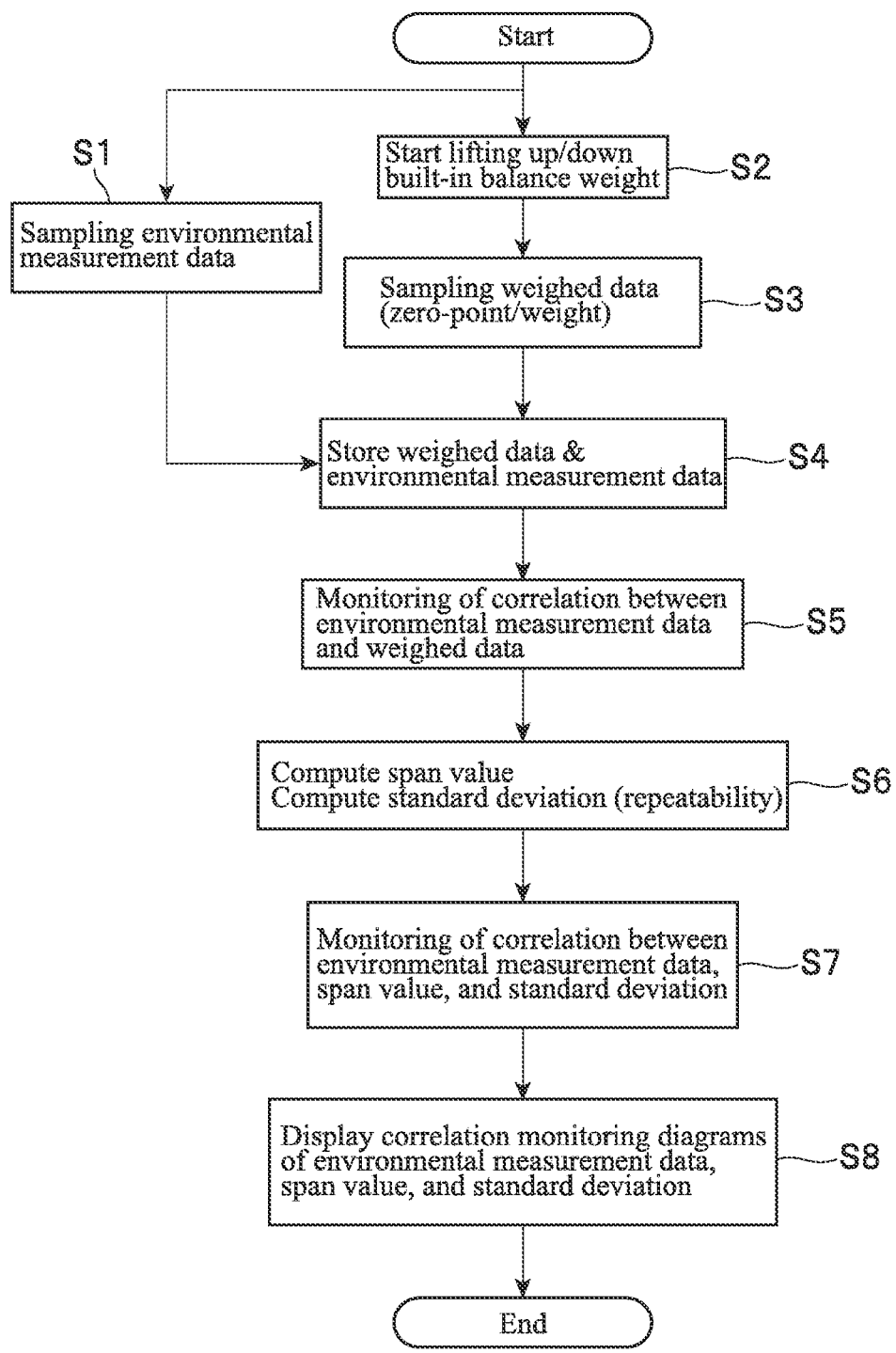
FIG. 2 is a flowchart of an environmental evaluation mode according to the first embodiment.

Next, an actuation in the above-described environmental evaluation mode will be described on the basis of a flowchart of the environmental evaluation mode according to the first embodiment shown in FIG. 2.

When the apparatus enters the environmental evaluation mode, first, in Step S1, environmental measurement data detected by the environmental sensor 10, that is respective measurement data of temperature, humidity, and atmospheric pressure are sampled. In addition, it is possible to arbitrarily select environmental components to be sampled depending on the requirements. Then, the sampling data on the respective environmental components are taken continuously for several hours to some days, to be recorded in the data logger 20 in step S4. In addition, it is possible to arbitrarily set this sampling time depending on the requirements.

Simultaneously with Step S1, in Step S2, the built-in balance weight 5 is automatically lifted up and down, for example, one time per minute in the load measuring mechanism 2, and in Step S3, data (weighed data) of a weight and a zero-point of the built-in balance weight 5 are sampled from the load measuring mechanism 2, and in Step S4, the data are recorded in the data logger 20 in the same way as the environmental measurement data.

The environmental measurement data and the weighed data recorded in the data logger 20 are, in Step S5, read out by the external CPU 32, and undergo monitoring so as to be correlated with the temporal axes of both being unified.

In addition, in Step S6, a span value of the built-in balance weight 5 is computed from the sampling weighed data, and moreover, a standard deviation with respect to a true value of the built-in balance weight 5 is computed from a plurality of span value data. Then, in Step S7, the temporal fluctuation in the span value also undergoes monitoring so as to be correlated with the temporal axes being unified, and temporal fluctuations in the standard deviation of the span value also undergo monitoring, in the calculated timing, so as to be correlated with the temporal axes being unified.

Then, in Step S8, as shown in FIGS. 3 to 6, when these temporal fluctuations are output to be displayed on the monitor 31 as a correlation monitoring diagram in which the time is plotted on the horizontal axis and the respective values are plotted on the vertical axis, the environmental evaluation mode is terminated.

Figure 3:
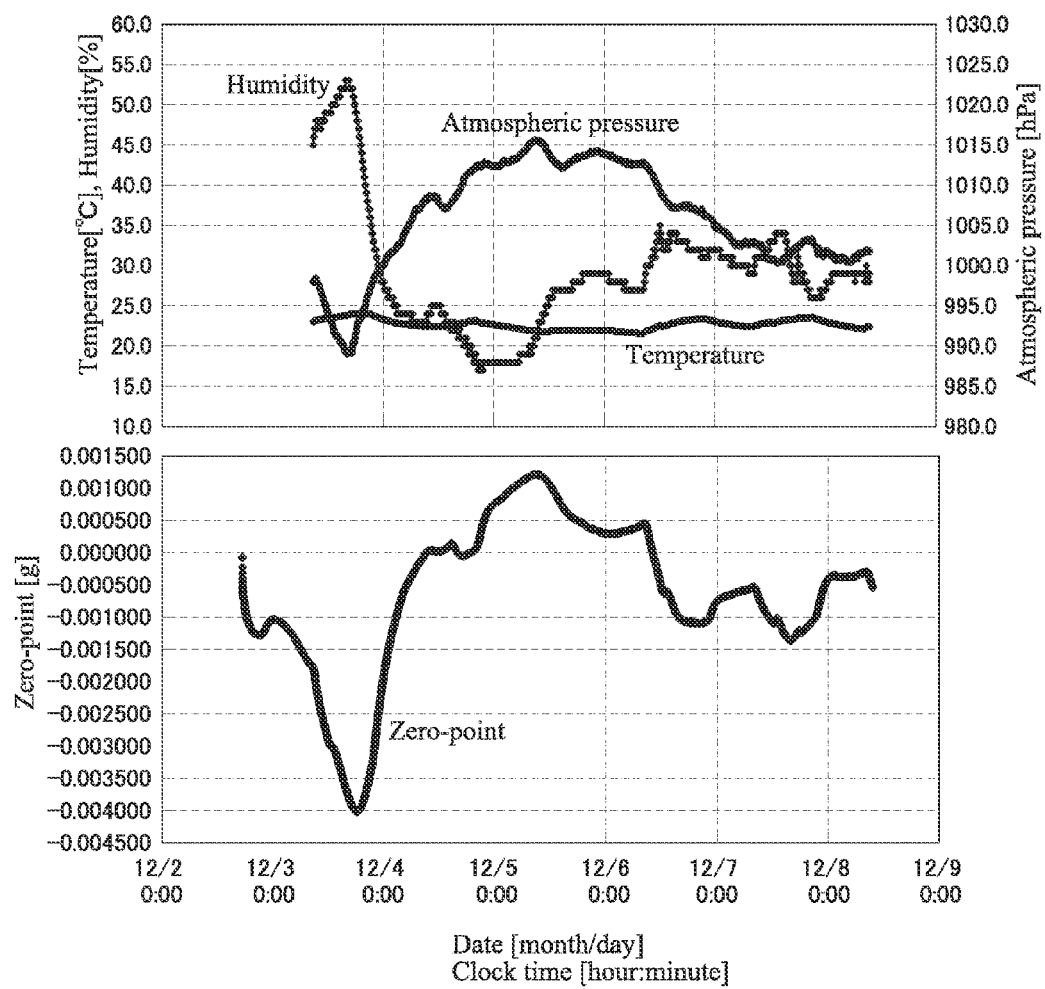
FIG. 3 are monitoring diagrams of a correlation between environmental measurement data and a zero-point obtained in the mode.

FIG. 3 are correlation monitoring diagrams of environmental measurement data and a zero-point obtained in the environmental evaluation mode, and temporal fluctuation graphs showing the appearances of simultaneously monitoring temporal fluctuation in environmental measurement data (temperature, humidity, atmospheric pressure) and temporal fluctuations in weighed data (zero-point). The horizontal axis shows time [Date:Clock Time], and the upper stage vertical axis shows temperature [° C.], humidity [%], atmospheric pressure [hPa], and the lower stage vertical axis shows zero-point [g].

When observing the monitoring diagram of the environmental measurement data (upper stage of FIG. 3), it is understood that a rapid drop in atmospheric pressure and an increase in humidity according to the drop in atmospheric pressure occurred on December 3rd at around 5 p.m. Then, when observing the monitoring diagram of the zero-point (lower stage of FIG. 3), it is understood that the zero-point fell significantly into negative territory on December 3rd at around 5 p.m. The detailed reason for this is because the buoyancy applied to the built-in balance weight 5 decreased due to a variation in atmospheric pressure, to weight the zero-point, and a mass moment is changed due to an increase in humidity, to break down the balance around the fulcrum of the balance.

However, because the variations of the respective values are displayed as time-series graphs as shown in FIG. 3, the correlation between the environmental variations and the variations in weighed data (correspondence relation) is disclosed in an easy-to-understand way for a user. Therefore, even if the user does not understand the aforementioned reason, when observing FIG. 3, it is possible to visually understand in one viewing that the rapid variation in zero-point is caused by a drop in atmospheric pressure and/or an increase in humidity. That is, because the temporal fluctuations in environmental measurement data around the electronic balance 1 and the temporal fluctuations in weighed data are correlated to undergo monitoring, and those temporal fluctuations are displayed via the monitor 31, that is the correlation between the environmental measurement data and the weighed data, which has not conventionally become apparent, is visually disclosed. Therefore, it is possible for a user to easily recognize that the poor performance of the electronic balance 1 is attributable to variations in the surrounding environment.

Figure 4:
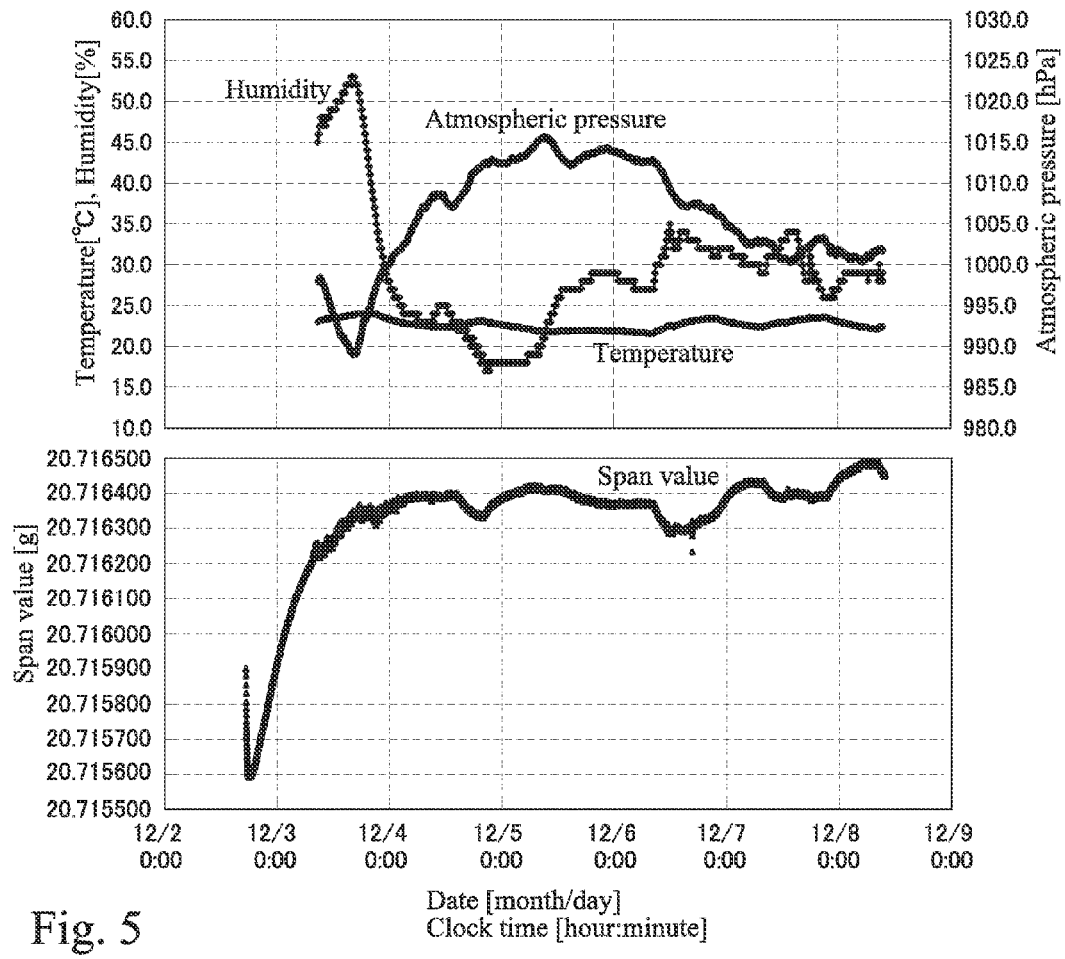
FIG. 4 are monitoring diagrams of a correlation between environmental measurement data and a span value obtained in the mode.

Next, FIG. 4 are monitoring diagrams of a correlation between environmental measurement data and a span value obtained in the mode. Because a span value is a difference between weighed data at the time of weighing a load with an already-known mass and a zero-point, in this case, the span value expresses a difference between a weight of the built-in balance weight 5 and a zero-point. Then, when observing the monitoring diagram of the span value (lower stage of FIG. 4), disorder in the data is confirmed on December 3rd at around 5 p.m. The reason for this is because of a buoyancy modification due to a drop in atmospheric pressure in the same way as described above.

Figure 5:
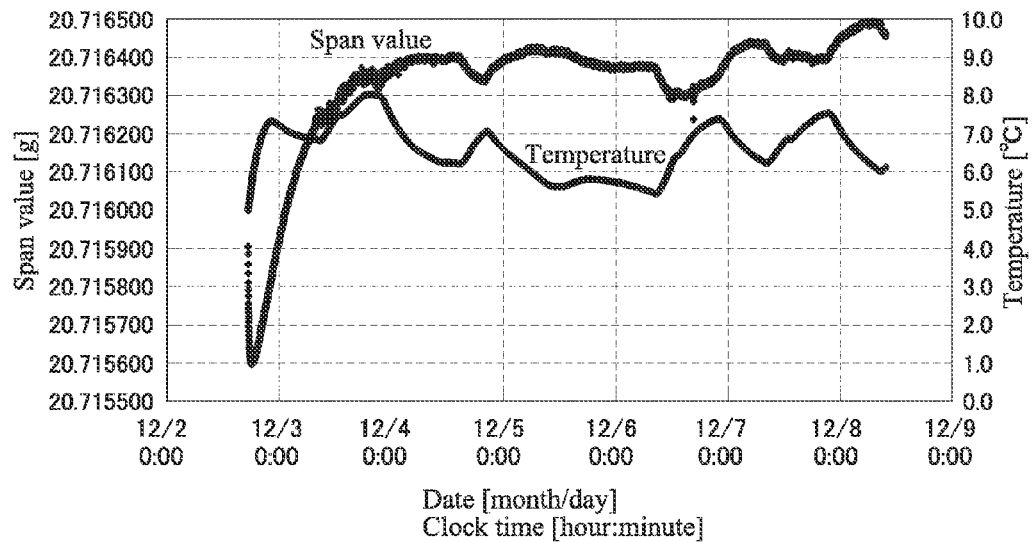
FIG. 5 is a monitoring diagram of a correlation between a temperature change and a span value obtained in the mode.

Further, FIG. 5 is a monitoring diagram of a correlation between a temperature change and a span value obtained in the mode. When observing FIG. 5, it is confirmed that the span value varies significantly according to an increase in temperature inside the balance immediately after application of power to the electronic balance 1. The reason for this is because of power-on drifting of the mass spectrometer as generally stated.

However, because the correlation between both are disclosed as a time-series graph in an easy-to-understand way for a user, when observing FIG. 4, it is possible for a user to understand in one viewing that the variation in span value results from a drop in atmospheric pressure and/or an increase in humidity, and when observing FIG. 5, it is possible to understand in one viewing that the variation in span value is caused by a temperature change up to passage of a given time after application of power.

Figure 6:
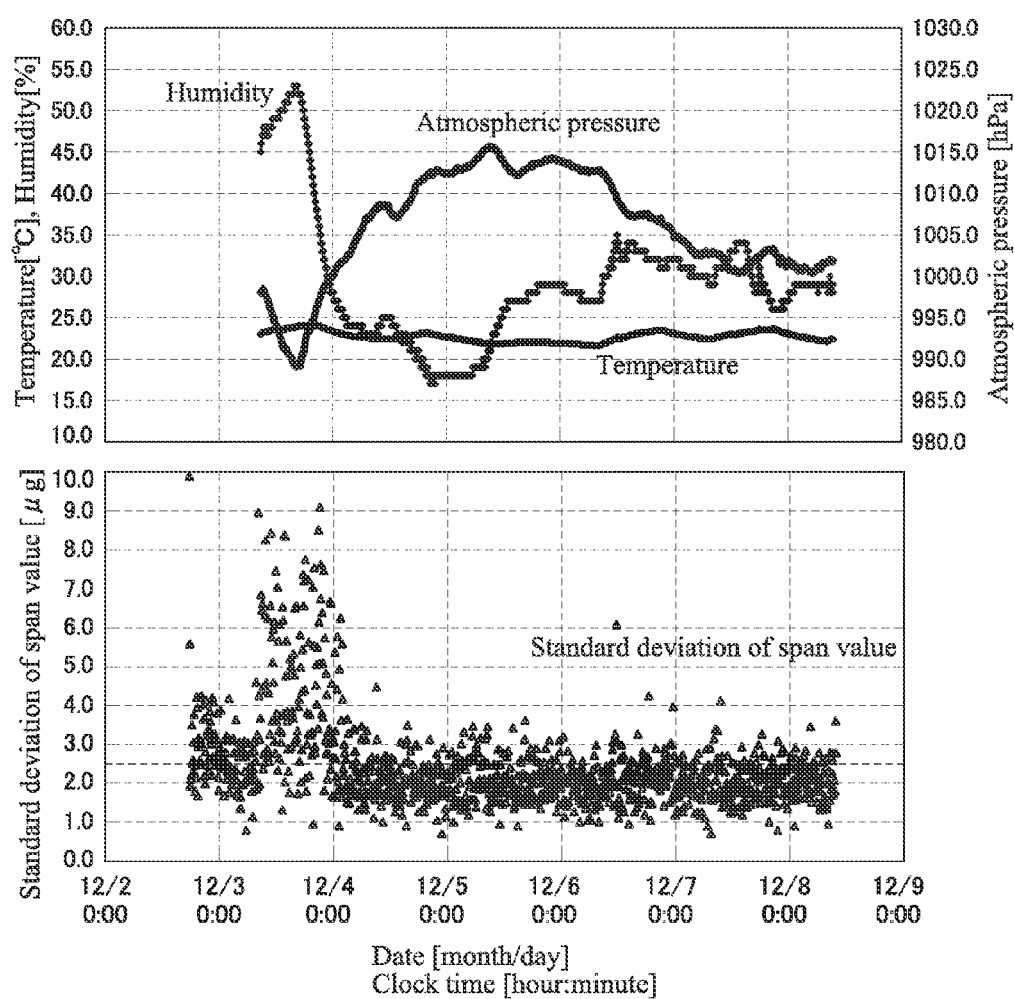
FIG. 6 are monitoring diagrams of a correlation between environmental measurement data and a standard deviation of a span value obtained in the mode.

Next, FIG. 6 are monitoring diagrams of a correlation between environmental measurement data and a standard deviation of the span value obtained in the mode, and the lower stage in FIG. 3 is a graph of a standard deviation of the span value. The standard deviation in the present embodiment is shown as a standard deviation of the span value which is calculated by repeatedly weighing the built-in balance weight 5 with an already-known mass ten times. Then, when observing the monitoring diagram (lower stage of FIG. 6) of the standard deviation showing repeatability, it is understood that the standard deviation (an error) is around substantially 2.5 μg from December 4th to December 8th, that is, stable weighing is performed. That is, as long as there are no significant environmental variations, the electronic balance 1 is assured of a weighing accuracy of 2.5 μg (this is the fundamental performance assured by the apparatus). However, it is understood that an error up to 9.0 μg occurs on December 3rd at around 5 p.m. on passing low pressure system. This is because of a variation in span value due to a fluctuation in atmospheric pressure. However, because the correlation between both is disclosed as time-series graphs in an easy-to-understand way, when observing FIG. 6, it is possible for a user to understand in one viewing that the increase in standard deviation (an error) generally showing the reliability is caused by a drop in atmospheric pressure and/or an increase in humidity.

Here, with FIG. 3, it is possible for the user to recognize the correlation between the temporal fluctuations in environmental measurement data and the temporal fluctuations in weighed data. In addition, as shown in FIGS. 4 to 6, because the temporal fluctuations in span value and/or standard deviation showing repeatability are simultaneously displayed in a correlative manner, it is easy to understand how the environmental variations are correlated with the reliability of the electronic balance 1. For example, in the case where a true value of mass is 200.0 g, given that a value of zero-point is 0.0 g, and a weight is 200.0 g, a span value is 200.0 g. Next, given that a value of zero-point is 0.1 g, and a weight is 200.1 g, a span value is 200.0 g. Therefore, if a span value does not vary even when the zero-point varies, it may be considered that the performance as a mass spectrometer is sufficiently assured. However, given that a value of zero-point is 0.1 g, and a weight is 200.5 g, a span value is 200.4 g, therefore, it is understood that poor performance occurs.

That is, it is possible to know how stable the already-known mass is weighed (how constant a difference between a weight at the time of weighing the already-known load and an unloaded zero-point is weighed) by monitoring a temporal fluctuations in span value.

Moreover, by monitoring a temporal fluctuations in standard deviation of span value, it is possible to know how the span value is reproduced, and providing the capability of showing the same weighed value even by calculating the same mass many times.

Then, by correlating these span values and standard deviation of the span values with the environmental variations, it is easier for the user to understand the correlation between variations in the surrounding environment of the electronic balance 1 and poor performance of the electronic balance 1.

As described above, because the temporal fluctuations in environmental measurement data, and the temporal fluctuations in weighed data, span value, and standard deviation of the span value are visually displayed as time-series graphs in a correlative manner, it is possible for a user to immediately recognize the relationship between poor performance of the electronic balance 1 and environmental variations, that increases the reliability of the electronic balance 1 for the user.

Further, from the correlation monitoring diagrams of FIGS. 3 to 6, it is possible for the user to know that variations in weighed data, span value, and standard deviation of the span value are caused by an increase in humidity, a drop in atmospheric pressure, and an increase in temperature. Therefore, it is possible for the user himself/herself to conduct improvement of the surrounding environment of the electronic balance 1 so as not to stop an air conditioner at leaving time, or to keep humidity constant.

Then, the fundamental performance (accuracy) presented by the electronic balance 1 is maintained by the environmental improvement by the user himself/herself, thereby achieving improvement in weighing accuracy from a new perspective (angle) of improving the installation environment.

Further, because the error (standard deviation) on December 3rd at around 5 p.m. is approximately 10 µg (approximately 0.01 mg) in the correlation monitoring diagram of the standard deviation of the span value (FIG. 6), it is possible for a user to understand that the maximal performance (minimum display) obtained under the current environment is 0.01 mg with reference to this correlation monitoring diagram. That is, at this time, it is possible for the user to judge on the scene whether the weighing is stopped when a required weighing accuracy is 1 µg (0.001 mg) or the weighing is continued when a required weighing accuracy is 1 mg which is no problem, therefore it is user-friendly.

As described above, the problem that in the case where the fundamental performance of the electronic balance 1 is not brought about, it is impossible for a user to understand whether the cause for that is poor performance caused by the installation environment, or poor performance in the weighing apparatus main body, this increases anxiety over whether to continue the weighing or trusting the weighed value, and substantially feeds uncertainty into the mass spectrometer itself, thereby restoring a sense of confidence in the mass spectrometer manufacturer.

In addition, in the lower stage of FIG. 6, the standard deviation of the span value is displayed as a standard deviation. However, a standard deviation which is determined by repeatedly weighing a zero-point and a weight may be displayed. By monitoring a temporal change in standard deviation of a zero-point or a weight, which are weighed data, it is possible to reliably know how the weighed data are reproduced. Therefore, even in the case where a standard deviation between a zero-point and a weight is displayed in a correlative manner, when observing the correlation monitoring diagram, it is possible for the user to understand in one viewing that the increase in standard deviation generally showing the reliability results from, for example, a drop in atmospheric pressure and/or an increase in humidity from the graph. Therefore, even in the case where a standard deviation between a zero-point and a weight is displayed in a correlative manner, it is easier for the user to understand the correlation between variations in the surrounding environment of the electronic balance 1 and poor performance of the electronic balance 1, that is the same effect obtained when the standard deviation of the span value is used.

Further, in the same way, in the lower stage of FIG. 3, the zero-point is displayed as weighed data. However, a weight may be displayed as weighed data.

Figure 7:
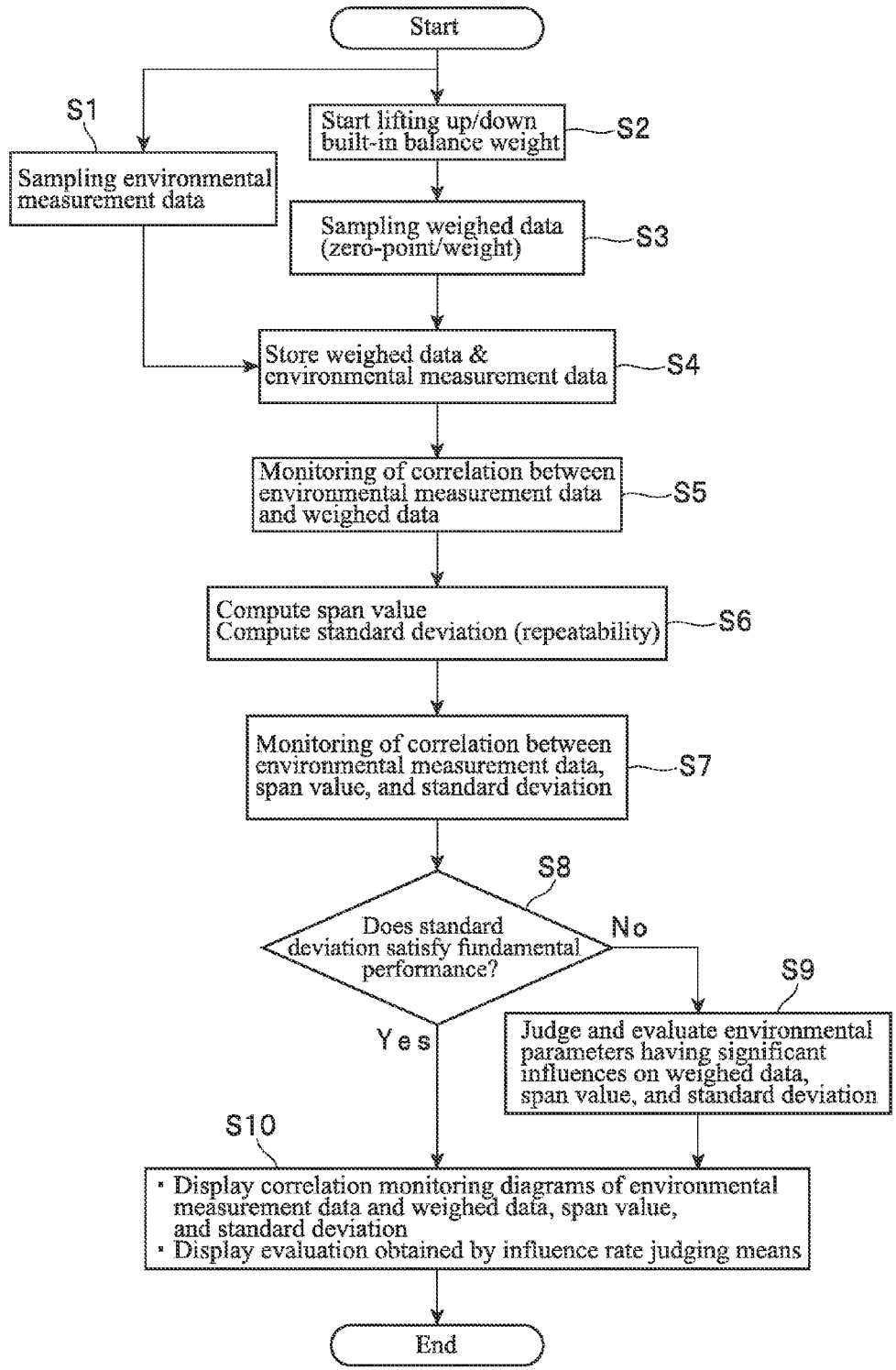
FIG. 7 is a flowchart of an environmental evaluation mode according to a second embodiment.

FIG. 7 is a flowchart of an environmental evaluation mode according to a second embodiment.

In the second embodiment, the configuration in the first embodiment is used, an influence rate evaluative function for judging which environmental parameter has the highest influence on weighed data and the like is added to the external CPU 32. That is, as shown in FIG. 7, in the second embodiment, an influence rate evaluative flow on and after Step S8 is added to the environmental evaluation mode in the first embodiment.

When the apparatus enters the environmental evaluation mode, in the same way as in the first embodiment, in Steps S1 to S7, the respective environmental measurement data of temperature, humidity, and atmospheric pressure and the weighed data of the built-in balance weight 5 are sampled, and the environmental measurement data, the weighed data and a span value, and a standard deviations of the span value undergo monitoring in a correlative manner.

Next, in Step S8, it is judged whether or not the calculated standard deviation satisfies the fundamental performance (standard deviation of 2.5 µg). When it is judged YES (the standard deviation is 2.5 µg or less), the process proceeds to Step S10, and in the same way as in the first embodiment, only the correlation monitoring diagram is displayed on the monitor 31, and the environmental evaluation mode is terminated. On the other hand, when it is judged NO (the standard deviation is greater than 2.5 µg), influence rates of environmental parameters are judged by the influence rate judging means in Step S9. In Step S9, for example, amounts of changes per unit time of the respective values are determined from the respective monitoring data, to be correlational-analyzed, a correlation coefficient r of the respective environmental components (temperature, humidity, atmospheric pressure) is determined for each of a variation in zero-point, a variation in span value, and a variation in standard deviation of the span value, to evaluate the influence rates of the environmental parameters such that the environmental components have greater influences in descending order of the absolute values of the correlation coefficients r. Then, in Step S10, when the judged result (evaluation) obtained in Step S9 is displayed on the monitor 31 along with the correlation monitoring diagram, the environmental evaluation mode is terminated.

By presenting this evaluation to the user, it is possible for the user to know which environmental parameter has the highest influence rate, and because the amounts of changes in the environmental measurement data are disclosed, and therefore, it is possible for the user to know how much improvement is required done for which environmental component. Therefore, it is possible for the user to estimate, for example, for temperature management, to what extent improvements are required for weighed data to be within a target management range, thus it is possible for the user to conduct the environmental improvement.

Or, a minimum display of a weighed value which is able to be determined under the current environment is estimated from the correlation coefficients r obtained by the influence rate judging means, and the effect thereof is displayed, or the digit which is not assurable of accuracy is deleted/blinked, so as to be presented to the user. Thereby, automatically suggesting the current maximal performance (minimum display) which is recognizable with reference to the standard deviation in the first embodiment by the electronic balance 1, it is easier for the user to judge whether or not the weighing is continued.

In addition, in the second embodiment, the standard deviation of the span value is used as a standard deviation used for influence rate evaluation. However, it goes without saying that a judgment may be carried out on the basis of a standard deviation of a zero-point or a weight in place of the standard deviation of the span value.

In addition, as the environment components detected by the environmental sensor 10 in the first and second embodiments, an accelerometer 14 may be added to detect vibration in addition to temperature, humidity, and atmospheric pressure. This is because an electronic balance with high weighing accuracy shown in the embodiment sufficiently receives, as a matter of course when an earthquake occurs, the effects of the ground shaking to an imperceptible extent for humans, and of shaking due to the flow of people which continue for awhile even after the convergence of an earthquake, and when performing weighing even in an environment in which there is a slight tremor, a weighing error occurs. Further, it is naturally possible to detect wind, sound pressure, gravitational force, and the like as other environmental components, to be incorporated in the embodiment.

Further, in the first and second embodiments, not only the environmental sensor 10, but also the data logger 20 is built into the electronic balance 1. Or, in place of the data logger 20, an internal memory usually built-in the electronic balance 1 may be used as storage means in this application. In the same way, the respective functions that the external PC 30 bears may be taken by the configuration of the electronic balance 1. That is, the processing in the external CPU 32 is performed by the internal CPU 3, and the correlation monitoring diagrams and evaluation to be displayed on the monitor 31 may be displayed on the display unit 4 for weighed value, etc. Thereby, having the entire apparatus composed of a weighing apparatus built-in the mass spectrometer, the configuration around the electronic balance body 1 is simplified, and the weighing apparatus is unitized, which improves the handling performance for a user.

Further, the method for displaying the correlation monitoring diagrams in the first and second embodiments may be in any display format as long as it is displayed so as to correlate those so as to correspond to the same temporal axis.

Moreover, the correlation monitoring diagrams in the first and second embodiments may be configured, as needed, to be displayed on a paper output from a printer which is connected to the external PC 30. That is, the correlation monitoring diagrams may be visually recognized via a paper as a display unit.

INDEX OF REFERENCE NUMERALS

1: Electronic balance (Mass spectrometer)
2: Load measuring mechanism
3: Internal CPU
4: Display unit on which weighed value and the like are displayed, which is conventionally the same
5: Built-in balance weight
6: Built-in balance weight inserting/deleting mechanism
7: Motor
8: Motor driving circuit
10: Environmental sensor (Environmental measurement means)
20: Data logger (Storage means)
30: External PC
31: Monitor (Display unit) of external PC
32: External CPU (Arithmetic processing unit)
100: Weighing apparatus

The invention claimed is:

1. A weighing apparatus comprising:
   a load measuring mechanism that detects weighed data;
   an environmental measurement sensor for detecting physical amounts in an environment in which the load measuring mechanism is installed;
   a memory for storing the weighed data detected by the load measuring mechanism, and environmental measurement data detected by the environmental measurement sensor; and
   a CPU including a visual display unit which performs arithmetic processing by use of the weighed data and the environmental measurement data stored in the memory, the weighing apparatus wherein the CPU correlates and records respective temporal fluctuations in the weighed data and the environmental measurement data, and the visual display unit simultaneously displays temporal fluctuation graphs which the weighted data and the environmental measurement data are arranged side by side or overlaid with respect to a common temporal axis on the display unit so as to make the temporal fluctuations visually recognizable via the display unit.

2. The weighing apparatus according to claim 1, wherein the CPU is configured to correlate at least one of a zero-point that is unloaded weighed data and a weight that is loaded weighed data with recorded data in the memory, so as to make correlated temporal fluctuation between the zero-point and the environmental measurement data, and/or correlated temporal fluctuation between the weight and the environmental measurement data visually recognizable via the display unit.

3. The weighing apparatus according to claim 1, wherein the CPU is configured to compute a span value which is a difference between weighed data at the time of weighing a load with an already-known mass and unloaded weighed data, and correlate the span value with the recorded data, so as to make a correlated temporal fluctuation between the span value and the environmental measurement data visually recognizable via the display unit.

4. The weighing apparatus according to claim 3, wherein the CPU is configured to compute a standard deviation of the span value which is determined by repeatedly weighing the load with the already-known mass several times, and correlate the standard deviation with the recorded data, so as to make correlated temporal fluctuation between the standard deviation of span value and the environmental measurement data visually recognizable via the display unit.

5. The weighing apparatus according to claim 2, wherein the CPU is configured to determine a standard deviation by repeatedly weighing the zero-point or the weight, and correlate the standard deviation with the recorded data, so as to make correlated temporal fluctuation between the standard deviation of the weight and the environmental measurement data, and/or correlated temporal fluctuation between the standard deviation of the zero-point and the environmental measurement data visually recognizable via the display unit.

6. The weighing apparatus according to claim 1, wherein the environmental measurement sensor is provided in an electronic balance having the load measuring mechanism.

7. The weighing apparatus according to claim 1, wherein the visual display unit displays only one temporal axis for the weighted data and the environmental measurement data.

* * * * *